April 21, 1959   J. BAUER, JR   2,883,654
HORN-LIGHT COMBINATION
Filed June 29, 1956
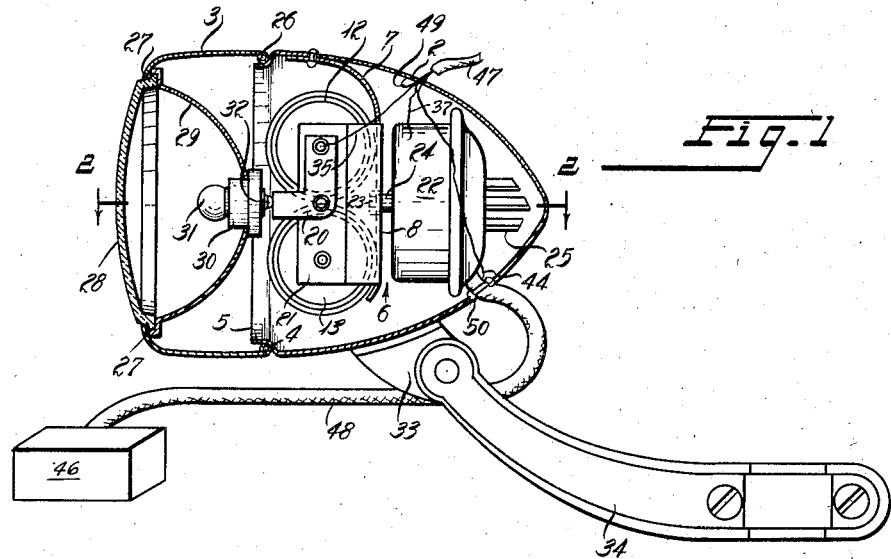
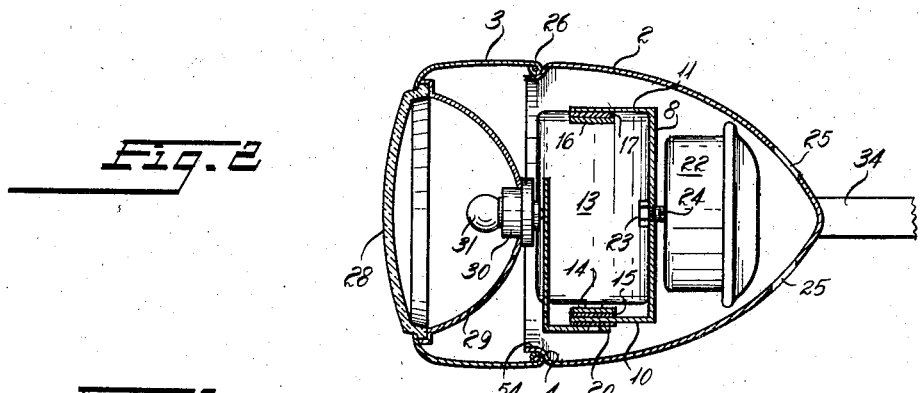
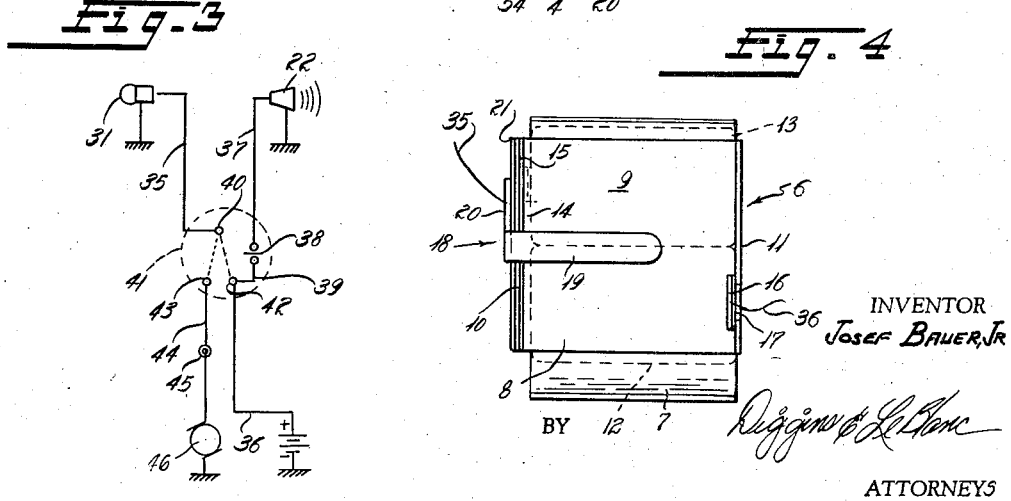
INVENTOR
Josef Bauer, Jr.
BY
ATTORNEYS

United States Patent Office 2,883,654
Patented Apr. 21, 1959

2,883,654

HORN-LIGHT COMBINATION

Josef Bauer, Jr., Klein-Auheim, Germany

Application June 29, 1956, Serial No. 594,993

4 Claims. (Cl. 340—393)

The present invention relates to cycle fixtures and more particularly to a battery-operated horn and lamp disposed within a single enclosure with the batteries, the lamp being alternatively energizable from a dynamo driven by the cycle.

In accordance with the present invention there is provided a two part case having separable front and rear sections. Secured within the rear section of the case is a battery housing having a base wall member and integral side walls for supporting therebetween and electrically contacting the batteries employed for actuating a horn and the lamp. The horn is disposed between the battery housing and the rear of the case and is secured to and supported by the base wall of the battery housing. In consequence, the horn may be initially secured to the base wall of the battery housing and then the horn and battery housing inserted in and secured to the case in a single operation thereby minimizing the number of physical elements required, the weight of the structure and the time required for fabrication and assembly. The front section of the case carries a lamp assembly including a lens, a reflector and a bulb disposed centrally of the reflector. The battery housing carries a resilient contact forwardly of and insulated from the batteries, the battery housing and the bulb being disposed in their respective sections of the case such that when the case is assembled the center contact of the bulb engages the resilient contact. One terminal of the horn, the batteries and the bulb are electrically connected to the case through their supporting members thereby requiring only a single lead for each element which results in an uncomplicated and economical wiring circuit.

The horn is permanently connected through a pushbutton switch to the batteries while the lamp may be alternatively connected to a cycle-driven dynamo or the batteries. In consequence, the lamp may be energized by the dynamo when the cycle is in motion to minimize drain on the battery, while the horn, which is not readily energizable by a dynamo, is always energized by the batteries.

It is an object of the present invention to provide a case for a battery-operated horn and lamp employing a novel unitary support for the horn and the batteries.

It is another object of the present invention to provide a two-part separable case for a battery-operated horn and lamp wherein the lamp is disposed in one section of the case and the horn and batteries are disposed in the other section of the case and wherein the horn and batteries are supported on a unitary member.

Another object of the present invention is to provide a cycle fixture including a battery-operated horn and battery which employs a small number of economical and readily fabricated parts.

It is still another object of the present invention to provide a cycle fixture including a horn and lamp wherein the lamp may be energized by batteries carried by the fixture or by a dynamo driven by the cycle.

The above and still further objects, features and advantages of the present invention will become apparent upon consideration of the following detailed description of one specific embodiment thereof, especially when taken in conjunction with the accompanying drawings, wherein:

Fig. 1 is a cross-sectional view in elevation of the novel cycle fixture provided by the present invention;

Fig. 2 is a horizontal section of the cycle fixture of Figure 1 taken on the line 2—2 in Figure 1;

Fig. 3 is a schematic wiring diagram of the circuit employed in the present invention; and Fig. 4 is a front view of a novel battery housing and horn support.

Referring specifically to Fig. 1 of the accompanying drawings, a lamp housing 1 comprises a back section 2 and a forward or front section 3. The back section 2 has a hollow paraboloidic configuration with the apex directed rearwardly and the front edge terminating in an inwardly directed circular right-angle flange 4 which provides a shoulder 5 generally parallel to the adjacent surface of rear section 2. Disposed within the rear section 2 of the housing is a unitary battery housing and horn support 6 illustrated in Figs. 1 and 4 of the accompanying drawings. The support 6 is fabricated from a single piece of conductive sheet metal and provides an arcuate upper section 7 terminating in a base wall 8 forming the base of a battery holder 9. Two end walls 10 and 11 of the battery holder 9 are integral with and extend at right angles to the base wall 8 thereby defining a holder 9 having a base wall 8 and two end walls 10 and 11. The inner surface of the end wall 10 carries a conductive strip insulated therefrom by a strip 15 of suitable insulating material in order to prevent batteries 12 and 13 from being short circuited through the base wall 8. If the batteries are arranged in series relation in the holder 9, the battery 12 has its base contacting the end wall 11 and its central terminal contacting the conductive strip 14 while the battery 13 has its base contacting strip 14 and its central terminal engaging a contact 16 carried by the end wall 11 but insulated therefrom by an insulator 17. A resilient contact 18 for engaging the center contact of a bulb, is carried by the support 6, the contact 18 comprising an elongated tongue 19 terminating in a plate 20 extending at right angles thereto, the tongue 19 extending to approximately the center of the battery holder 9. The plate 20 is disposed parallel to the end wall 10 and is suitably secured thereto by riveting and is isolated therefrom by a thin strip 21 of insulating material disposed between the end wall 10 and the plate 20.

The arcuate upper section 7 of the support 6 is secured as by riveting to the upper surface of the rear section 2 of the case 1, the support 6 being positioned such that the resilient tongue 19 of the contact 18 is aligned with the flange 4. An electric horn 22 is directed rearwardly of the casing 1 and is suitably secured to the base wall 8 of the housing 6 as by a nut 23 which engages a bolt 24 extending forwardly from and secured to the horn 22. The rear section 2 of the case 1 is apertured, as designated by the reference numeral 25, to prevent undue attenuation of the sounds generated by the horn 22.

The front section 3 of the casing 1 comprises a hollow cylindrical sleeve terminating at its rearward end in a rolled bead 26 and at its forward end in an inwardly directed flange 27 against which the rim of a lens 28 is held by a reflector 29. Supported at the center of the reflector 29 is an electric lamp socket 30, having disposed therein an electric lamp 31, including a center contact 32.

The two sections 2 and 3 of the case 1 are assembled by forcing the rolled bead 26 over the shoulder 5, the engagement thus provided holding the two sections 2 and 3 together. When the two sections of the casing 1 are thus assembled the center contact 32 of the bulb 31 engages the tongue 19 of the contact 18.

Secured to the lower surface of the section 2 is a downwardly extending plate 33 adjustably secured to a bracket 34 which is adapted to engage a frame member of a cycle to support the combined horn and light. The type of mounting bracket employed is not restrictive, various well-known means for mounting the device being well-known in the art.

The physical construction of the combined light and battery as described above permits ready access to the batteries 12 and 13 by merely removing the front section 3 of the casing 1, and the construction of the housing 6 for the batteries and the horn 22 lends itself to rapid fabrication and attachment to the case. The utilization of a single support for the batteries and horn further minimizes the number of physical components required thereby providing an economical and light weight unit.

Proceeding now to a description of the novel circuit arrangement for selectively operating the horn and light and for selectively operating the light from batteries or a cycle-driven dynamo reference is initially made to Fig. 1. The case of the horn 22 is electrically connected to the base 8 by the bolt 24 and one terminal of the series connected batteries 12 and 13 is connected to the base 8 through the wall 11, the base 8 being connected to the case 1 by the arcuate member 7 of the support 6. One terminal of the bulb 31 is connected to the case 1 through the socket 30 and the reflector 29. Thus all of the circuit elements enclosed within the case have one terminal connected to the case 1 and only a single lead is required for each circuit element to complete the electrical circuits. The plate 20 which engages the center contact 32 of the bulb 31 is connected to a lead 35 and the contact 16, which engages the ungrounded end of the series connected batteries is connected to a lead 36. The horn 22 is provided with a lead 37 connected via a normally-open push-button switch 38 (see Fig. 3) and a lead 39 to the lead 36 connected to the ungrounded terminal of the series connected batteries. The lead 35 is connected to a movable contact 40 of a single pole double throw switch 41 having two stationary contacts 42 and 43. The stationary contact 42 is connected to the battery lead 36 and the contact 43 is connected via lead 44, a switch 45, or other suitable circuit-disconnect device, to one terminal of a dynamo 46. The dynamo 46 is a conventional cycle-driven dynamo adapted to be mounted on the frame of the cycle adjacent one of the wheels by which it is adapted to be driven.

In consequence, of the aforesaid circuit connectors, the horn 22 which is not suited to energization by the dynamo 46, is always connected in circuit with the batteries 12 and 13 and may be energized by depressing the push-button switch 38. The bulb 31 is suited to energization by either a dynamo or battery and may be selectively connected in circuit with the batteries 12 and 13 or the dynamo 46 by causing the variable contact 40 to engage, respectively, the stationary contacts 42 and 43 of the switch 41. Thus, when the cycle is being propelled, the bulb 31 may be energized by the dynamo 46, thereby reducing drain on the batteries 12 and 13. Alternatively, when the cycle is at a standstill the bulb 31 may be energized by the batteries 12 and 13 thus allowing the lamp to be illuminated at night regardless of whether the cycle is moving or standing still. In order to permit the bulb 31 to remain deenergized during daylight hours the switch 45 is provided which when opened disconnects the dynamo 46 from the circuit, and then by causing the contact 40 to engage contact 43 of the switch 41, the bulb is disconnected from the circuit. Alternatively, the switch 41 may be a three position switch having one contact unconnected to provide an off position for the lamp in which case the switch 45 may be eliminated.

The switches 38 and 41 are normally disposed on the handle bars of the cycle and therefore are not illustrated in Fig. 1 of the accompanying drawings, the switches being connected over a cable 47 to the interior of the case 1. The dynamo 46 is connected over a cable 48 to the interior of the case 1 and the cables 47 and 48 may carry case-ground leads 49 and 50, respectively, as illustrated in Fig. 1 or the ground leads may be dispensed with and the entire circuit grounded through the frame of the cycle.

It will be noted that the housing 6 for the batteries 12 and 13 and the horn 22 provides a case ground return for both of these elements and in consequence reduces the cost of wire employed in the device and the time required for wiring. Further, the utilization of a cycle-driven dynamo and the switching arrangement described allows the cyclist to minimize the drain on the batteries by operating the lamp from the dynamo while the cycle is moving.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What is claimed is:

1. A cycle fixture comprising a casing having front and rear sections, said front section provided with an open front end, a battery housing secured to and disposed in said rear section of said casing, said battery housing including a base wall and two opposed end walls disposed substantially perpendicular to said base wall, said end walls adapted to receive therebetween and to electrically contact at least one electrical battery, insulating means secured to portions of said end walls for preventing said battery from being short-circuited, a horn, means for securing said horn to a side of said base wall opposite said battery and for electrically connecting one terminal of said horn to said base wall, said rear section of said casing provided with a plurality of apertures adjacent said horn to prevent muffling of the sound from said horn, and a support member secured to said base wall and to said casing, said support member positioning said base wall within said rear section and electrically grounding said base wall to said casing.

2. The combination in accordance with claim 1, further comprising a lamp unit including a bulb having a center contact, said lamp unit being disposed in said front section of said casing, a resilient contact secured to said battery housing and insulated therefrom, said resilient contact engaging the center contact of the bulb of said lamp unit.

3. A cycle fixture comprising a casing having disengageable front and rear sections, said front section provided with an open front end, a battery housing, means for securing said battery housing in said rear section of said casing, said battery housing including a conductive base wall and two opposed conductive end walls integral with and disposed approximately perpendicular to said base wall, said end walls adapted to receive therebetween a pair of batteries each having two terminals, one of said end walls having a conductive strip electrically contacting each of said batteries, the other of said end walls having a conductive strip electrically contacting one of said batteries, insulating means secured to said end walls between said end walls and said conductive strips, an electrically actuatable horn having two electrical terminals, means for supporting said horn on a side of said base wall opposite said batteries and electrically connecting one of said terminals thereto, said rear section of said casing provided with a plurality of apertures adjacent said horn to prevent muffling of the sound from said horn, said means for securing said battery housing in said rear section of said casing including a support member secured to said base wall and to said casing, said support member positioning said base wall within said rear section and electrically grounding said base wall to said casing.

4. The combination in accordance with claim 3, further comprising a lamp unit adapted to receive a bulb having two terminals, said lamp unit being disposed in said front section of said case and being adapted to connect electrically one terminal of the bulb to said case, a resilient contact adapted to engage the other terminal of the bulb and means for supporting said resilient contact on said battery housing and for electrically isolating said resilient contact from said battery housing.

References Cited in the file of this patent

UNITED STATES PATENTS

| | | |
|---|---|---|
| 1,993,765 | Waker | Mar. 12, 1935 |
| 2,169,256 | Kraeft | Aug. 15, 1939 |
| 2,218,408 | Meyerhoefer | Oct. 15, 1940 |
| 2,248,460 | Kraeft | July 8, 1941 |
| 2,580,938 | Martin | Jan. 1, 1952 |
| 2,671,212 | Mingle | Mar. 2, 1954 |

UNITED STATES PATENT OFFICE
CERTIFICATE OF CORRECTION

Patent No. 2,883,654                                  April 21, 1959

Josef Bauer, Jr.

It is hereby certified that error appears in the printed specification of the above numbered patent requiring correction and that the said Letters Patent should read as corrected below.

Column 2, line 32, after "strip" insert the numeral -- 14 --; column 4, line 48, for "hulb" read -- bulb --; line 73, for "scound" read -- sound --.

Signed and sealed this 11th day of August 1959.

(SEAL)
Attest:

KARL H. AXLINE
Attesting Officer

ROBERT C. WATSON
Commissioner of Patents